US007831535B2

(12) United States Patent
Flinn et al.

(10) Patent No.: US 7,831,535 B2
(45) Date of Patent: Nov. 9, 2010

(54) ADAPTIVE KNOWLEDGE LIFECYCLE MANAGEMENT ALIGNED WITH ASSESSED FINANCIAL VALUE BASED ON ORGANIZING STRUCTURE OF KNOWLEDGE ASSETS

(75) Inventors: Steven Dennis Flinn, Houston, TX (US); Naomi Felina Moneypenny, Houston, TX (US)

(73) Assignee: ManyWorlds, Inc., Houston, TX (US)

( * ) Notice: Subject to any disclaimer, the term of this patent is extended or adjusted under 35 U.S.C. 154(b) by 427 days.

(21) Appl. No.: 11/552,489

(22) Filed: Oct. 24, 2006

(65) Prior Publication Data
US 2007/0112712 A1 May 17, 2007

Related U.S. Application Data

(60) Provisional application No. 60/732,810, filed on Nov. 2, 2005.

(51) Int. Cl.
*G06N 5/02* (2006.01)
(52) U.S. Cl. .............................. 706/46; 705/1.1; 705/7; 705/10; 705/36 R
(58) Field of Classification Search .................. 706/46; 705/1, 10, 1.1, 7, 36 R; 707/104.1
See application file for complete search history.

(56) References Cited

U.S. PATENT DOCUMENTS

| 5,644,686 | A * | 7/1997 | Hekmatpour | 706/45 |
| 5,867,799 | A * | 2/1999 | Lang et al. | 707/1 |
| 5,870,559 | A | 2/1999 | Leshem et al. | |
| 6,182,067 | B1 * | 1/2001 | Presnell et al. | 1/1 |
| 6,249,768 | B1 * | 6/2001 | Tulskie et al. | 705/7 |
| 6,411,936 | B1 * | 6/2002 | Sanders | 705/10 |
| 6,934,748 | B1 | 8/2005 | Louviere | |
| 6,959,280 | B1 * | 10/2005 | Risen et al. | 705/4 |
| 6,981,040 | B1 | 12/2005 | Konig | |
| 2001/0047358 | A1 * | 11/2001 | Flinn et al. | 707/100 |
| 2002/0069102 | A1 * | 6/2002 | Vellante et al. | 705/10 |
| 2004/0143753 | A1 * | 7/2004 | Hernacki et al. | 713/200 |
| 2006/0106847 | A1 * | 5/2006 | Eckardt et al. | 707/101 |

(Continued)

FOREIGN PATENT DOCUMENTS

WO PCT/US2004/037176 6/2005

(Continued)

OTHER PUBLICATIONS

"A refutation of Metcalfe's Law and a better estimate for the value of networks and network interconnections", A. Odlyzko, B. Tilly, Digital Technology Center, University of Minnesota, Mar. 2, 2005, pp. 1-11.*

(Continued)

*Primary Examiner*—Michael B. Holmes
*Assistant Examiner*—Mai T Tran

(57) ABSTRACT

In accordance with the embodiments described herein, a method and system for adaptive knowledge lifecycle management, and methods for delivering adaptive knowledge lifecycle management services to customers, is disclosed. Adaptive knowledge lifecycle management provides a means for beneficially adapting knowledge assets and their collective structures over time. It also provides a means for generating an estimate of the value of knowledge assets and their associated organizing topologies, as well as providing a means to determine changes in value corresponding to changes to the knowledge assets and their associated organizing topologies.

14 Claims, 12 Drawing Sheets

U.S. PATENT DOCUMENTS

2007/0021968 A1 * 1/2007 Amir et al. ..................... 705/1

FOREIGN PATENT DOCUMENTS

WO  PCT/US2005/011951      12/2005

OTHER PUBLICATIONS

Odlyzko and Tilly, A refutation of Metcalfe's Law and a better estimate for the value of networks and network Digital Technology Center, University of Minnesota, Mar. 2, 2005, (preliminary version) interconnections, pp. 1-11.

Thomke and Bell, "Sequential Testing in Product Developement," Management Science, Feb. 2001, vol. 47 No. 2, pages 308-323.

* cited by examiner

US 7,831,535 B2

ADAPTIVE KNOWLEDGE LIFECYCLE MANAGEMENT ALIGNED WITH ASSESSED FINANCIAL VALUE BASED ON ORGANIZING STRUCTURE OF KNOWLEDGE ASSETS

CROSS-REFERENCE TO RELATED APPLICATIONS

The present application claims priority under 35 U.S.C. §119(e) to U.S. Provisional Patent Application Ser. No. 60/732,810, entitled "Adaptive Knowledge Lifecycle Management," filed on Nov. 2, 2005.

FIELD OF INVENTION

This invention relates to the management of knowledge and computer-based information assets.

BACKGROUND

Knowledge management has been a focus of businesses and other types of organizations for the past several decades. There has been a wide-spread recognition that more effective and efficient management of knowledge is critical for most businesses. Nevertheless, there has historically been a disappointment in the actual value generated by knowledge management initiatives.

There have been several reasons for this disappointment. First, the informational scope of most knowledge management approaches has traditionally been limited to information that is in the form of text-based and/or multi-media-based documents, or more broadly, "unstructured" information. What this informational scope omits is "structured" information such as, for example, financial information. Further, this historical domain of knowledge management has not typically encompassed other types of "knowledge assets" such as computer-based interactive programs, and human resource-based assets (i.e., people).

A second cause for disappointment with knowledge management is that there has been a lack of useful quantification methodologies associated with knowledge assets, and which explicitly encompass the organizing structures of the knowledge assets. This has made it difficult to establish a credible baseline of knowledge asset and management value, and to thereby measure improvement from the baseline. In other words, in the prior art there has been little transparency with regard to which knowledge assets are truly valuable and which are not, on either an absolute or relative basis.

A third cause for disappointment with knowledge management is that computer-based knowledge management systems have been insufficiently automatically adaptive, requiring the need for significant on-going manual effort to keep collections of knowledge assets well organized for multiple purposes or applications. After heroic initial manual efforts to effectively organize knowledge assets, knowledge asset "entropy" inevitably increases over time, and the knowledge assets and their structure becoming decreasingly useful.

In addition to these causes of disappointment, knowledge management initiatives have historically been primarily internally managed by businesses and institutions. Web Services, or more broadly, on-demand computing approaches, have generally not been applied since knowledge management-related software has typically not been available in Web services form, and collaborative knowledge management among one or more knowledge management suppliers and a knowledge management customer, including technology and/or services, has been awkward to implement. This has limited the value that third party suppliers could deliver to customers in the area of knowledge management, and reduced the ability of knowledge management customers to leverage third party capabilities.

Hence, there is a need for an improved method and system for managing collections of broadly defined knowledge assets, for valuing alternative organizing approaches associated with the knowledge assets, and for delivering knowledge management oriented technology and services to customers.

SUMMARY OF INVENTION

In accordance with the embodiments described herein, a method and system for adaptive knowledge lifecycle management is disclosed. The present invention may integrate with ManyWorlds' knowledge lifecycle methods, including process lifecycle methods, as well as knowledge and content lifecycle methods. Adaptive knowledge lifecycle management may furthermore integrate with the ManyWorlds' Generative Investment™, Adaptive Decision Processes and Adaptive Recombinant Processes methods and systems.

DETAILED DESCRIPTION

Figure 1A:
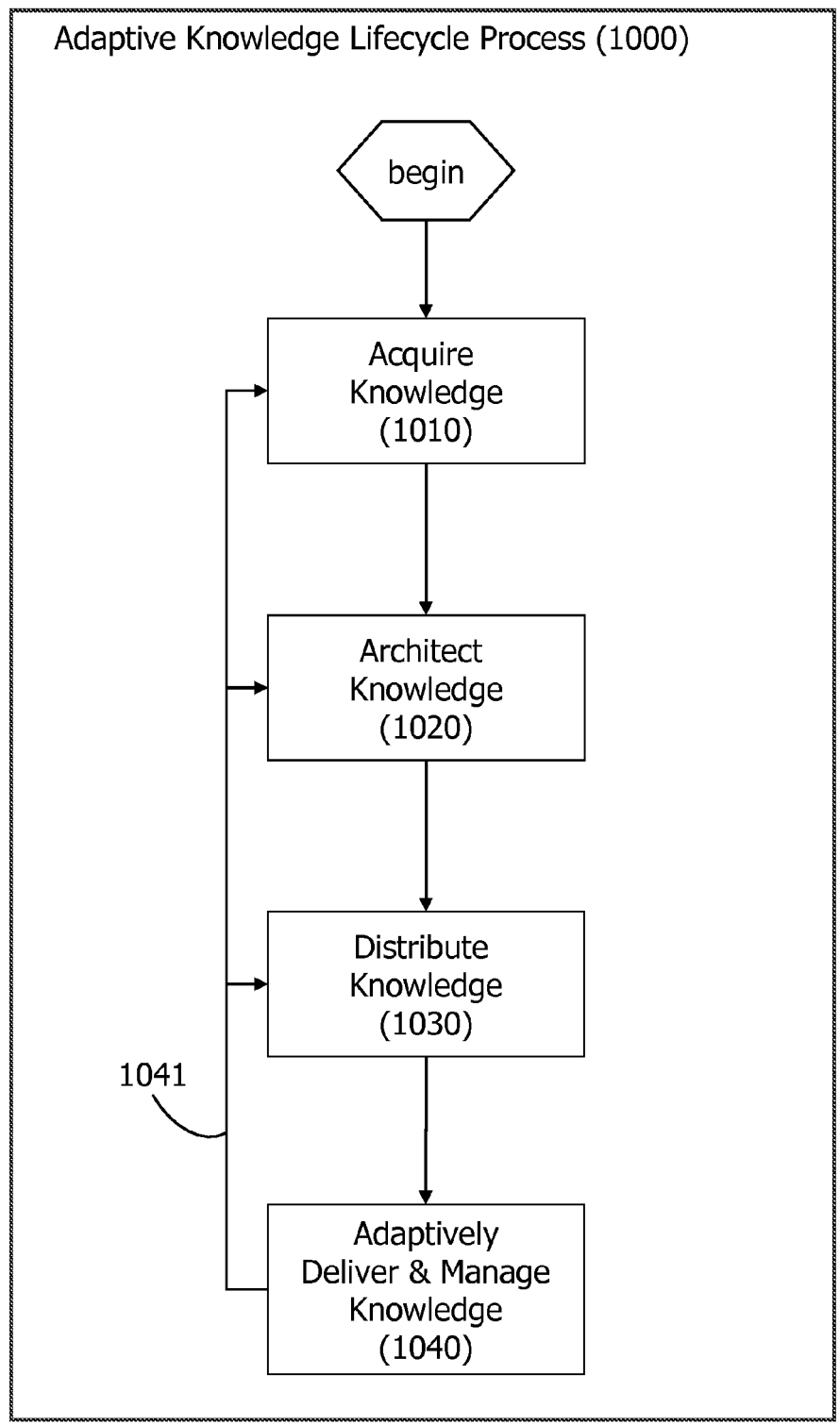
FIG. 1A is a flow diagram of an adaptive knowledge lifecycle process, according to some embodiments.

In the following description, numerous details are set forth to provide an understanding of the present invention, adaptive knowledge lifecycle management. However, it will be understood by those skilled in the art that the present invention may be practiced without these details and that numerous variations or modifications from the described embodiments may be possible.

In accordance with the embodiments described herein, a method and a system for adaptive knowledge lifecycle management, third party services thereof, and valuation of knowledge assets is disclosed.

DEFINITIONS

"Knowledge Assets" is defined herein to include any computer-based information, including documents, Web sites, graphics, audio, video, interactive computer applications, and any other type of executable software. In some contexts herein, "knowledge assets" may imply that the corresponding computer-based information has some implicit or explicit value. Knowledge assets may be nested, so that a specific knowledge asset may contain one or more other knowledge assets.

"Business process" or "process" is defined herein as a set of activities that collectively perform a business or non-business-related function. The activities within a process are typically performed in a specific sequence, with the sequence of activities subsequent to any specified activity being potentially dependent on conditions and decisions taken at the previous activity step. It should be understood that the descriptions of processes and related features, and the application of adaptive knowledge lifecycle management, extends to non-business institutions and organizations.

"Semi-automatic" or "semi-automatically," as used herein, is defined to mean that the described activity is conducted through a combination of one or more automatic computer-based operations and one or more direct human interventions.

"Process participants," as defined herein is synonymous with "system users" or "users" and are defined as individuals that perform some activity within a process, or otherwise interact with a process, or provide input to, or use the output from, a process or sub-process. For example, a process participant in a sales process may include sales people that perform selling activities, but may also include customers or prospective customers that interact with the sales process, including the review and consideration of, and/or the purchasing of goods or services. Further, managers who rely on input from, and/or provide guidance to, the sales process may be considered process participants in the sales process. Further, specific actions or behaviors of the customer or prospective customer may be defined as activities corresponding to the process or sub-process.

A process "activity" as defined herein typically represents a unit of work to be conducted in a prescribed manner by one or more participants in a process, and possibly according to a prescribed workflow. However, as defined herein, an activity may also simply constitute a process participant action or behavior. For example, a process participant for a sales process might be a prospective customer, and a behavior of the prospective customer may constitute an activity. In such cases a process participant, for example, a customer or prospective customer, may not be aware that their behaviors or interactions with a process constitute conducting a formally defined activity, although from the perspective of another process participant or the process owner, the activity may constitute a formally defined activity.

"Usage behaviors" is defined herein to include the interactions of one or more users with a computer-based system, or the monitoring of behaviors of one or more individuals by a computer-based system. Usage behaviors may include, but are not limited to the categories described in Table 1.

TABLE 1

Usage behavior categories and usage behaviors

| usage behavior category | usage behavior examples |
| --- | --- |
| navigation and access | activity, content and computer application accesses, including buying/selling paths of accesses or click streams |
| subscription and self-profiling | personal or community subscriptions to process topical areas interest and preference self-profiling affiliation self-profiling (e.g., job function) |
| collaborative | referral to others discussion forum activity direct communications (voice call, messaging) content contributions or structural alterations |
| reference | personal or community storage and tagging personal or community organizing of stored or tagged information |
| direct feedback | user ratings of activities, content, computer applications and automatic recommendations user comments |
| physiological responses | direction of gaze brain patterns blood pressure heart rate |
| environmental conditions and location | current location location over time relative location to users/object references current time current weather condition |

Referring to Table 1 and FIG. 3 (which is described in more detail in a later section), a first category of process usage behaviors 920 is known as system navigation and access behaviors. System navigation and access behaviors include usage behaviors 920 such as accesses to, and interactions with online computer applications and content such as documents, Web pages, images, videos, audio, multi-media, interactive content, interactive computer applications, e-commerce applications, or any other type of information item or system "object." These process usage behaviors may be conducted through use of a keyboard, a mouse, oral commands, or using any other input device. Usage behaviors 920 in the system navigation and access behaviors category may include, but are not limited to, the viewing or reading of displayed information, typing written information, interacting with online objects orally, or combinations of these forms of interactions with computer-based applications.

System navigation and access behaviors may also include executing transactions, including commercial transactions, such as the buying or selling of merchandise, services, or financial instruments. System navigation and access behaviors may include not only individual accesses and interactions, but the capture and categorization of sequences of information or system object accesses and interactions over time.

A second category of usage behaviors 920 is known as subscription and self-profiling behaviors. Subscriptions may be associated with specific topical areas or other elements of the adaptive computer-based application 925, or may be associated with any other subset of the adaptive computer-based application 925. Subscriptions may thus indicate the intensity of interest with regard to elements of the adaptive computer-based application 925. The delivery of information to fulfill subscriptions may occur online, such as through electronic mail (email), on-line newsletters, XML feeds, etc., or through physical delivery of media.

Self-profiling refers to other direct, persistent (unless explicitly changed by the user) indications explicitly designated by the one or more process participants regarding their preferences and interests, or other meaningful attributes. A process participant 200 may explicitly identify interests or affiliations, such as job function, profession, or organization, and preferences, such as representative skill level (e.g., novice, business user, advanced). Self-profiling enables the adaptive computer-based application 925 to infer explicit preferences of the process participant. For example, a self-profile may contain information on skill levels or relative proficiency in a subject area, organizational affiliation, or a position held in an organization. A process participant 200 that is in the role, or potential role, of a supplier or customer may provide relevant context for effective adaptive e-commerce applications through self-profiling. For example, a potential supplier may include information on products or services offered in his or her profile. Self-profiling information may be used to infer preferences and interests with regard to system use and associated topical areas, and with regard to degree of affinity with other process participant community subsets. A process participant may identify preferred methods of information receipt or learning style, such as visual or audio, as well as relative interest levels in other communities.

A third category of usage behaviors 920 is known as collaborative behaviors. Collaborative behaviors are interactions among the one or more process participants. Collaborative behaviors may thus provide information on areas of interest and intensity of interest. Interactions including online referrals of elements or subsets of the adaptive computer-based application 925, such as through email, whether to other process participants or to non-process participants, are types of collaborative behaviors obtained by the adaptive computer-based application 925.

Other examples of collaborative behaviors include, but are not limited to, online discussion forum activity, contributions of content or other types of objects to the adaptive computer-based application 925, or any other alterations of the elements, objects or relationships among the elements and objects of adaptive computer-based application 925. Collaborative behaviors may also include general user-to-user communications, whether synchronous or asynchronous, such as email, instant messaging, interactive audio communications, and discussion forums, as well as other user-to-user communications that can be tracked by the adaptive computer-based application 925.

A fourth category of process usage behaviors 920 is known as reference behaviors. Reference behaviors refer to the saving or tagging of specific elements or objects of the adaptive computer-based application 925 for recollection or retrieval at a subsequent time. The saved or tagged elements or objects may be organized in a manner customizable by process participants. The referenced elements or objects, as well as the manner in which they are organized by the one or more process participants, may provide information on inferred interests of the one or more process participants and the associated intensity of the interests.

A fifth category of process usage behaviors 920 is known as direct feedback behaviors. Direct feedback behaviors include ratings or other indications of perceived quality by individuals of specific elements or objects of the adaptive computer-based application 925, or the attributes associated with the corresponding elements or objects. The direct feedback behaviors may therefore reveal the explicit preferences of the process participant. In the adaptive computer-based application 925, the adaptive recommendations 910 may be rated by process participants 200. This enables a direct, adaptive feedback loop, based on explicit preferences specified by the process participant. Direct feedback also includes user-written comments and narratives associated with elements or objects of the computer-based system 925.

A sixth category of process usage behaviors is known as physiological responses. These responses or behaviors are associated with the focus of attention of users and/or the intensity of the intention, or any other aspects of the physiological responses of one or more users 200. For example, the direction of the visual gaze of one or more users may be determined. This behavior can inform inferences associated with preferences and/or intentions or interests even when no physical interaction with the one or more computer-based systems 925 is occurring. Even more direct assessment of the level of attention may be conducted through access to the brain patterns or signals associated with the one or more users. Such patterns of brain functions during participation in a process can inform inferences on the preferences and/or intentions or interests of users, and the intensity of the preferences and/or intentions or interests. The brain patterns assessed may include MRI images, brain wave patterns, relative oxygen use, or relative blood flow by one or more regions of the brain.

Physiological responses may include any other type of physiological response of a user 200 that may be relevant for making preference or interest inferences, independently, or collectively with the other usage behavior categories. Other physiological responses may include, but are not limited to, utterances, gestures, movements, or body position. Attention behaviors may also include other physiological responses such as breathing rate, heart rate, blood pressure, or galvanic response.

A seventh category of process usage behaviors is known as environmental conditions and physical location behaviors. Physical location behaviors identify physical location and mobility behaviors of users. The location of a user may be inferred from, for example, information associated with a Global Positioning System or any other positionally or locationally aware system or device, or may be inferred directly from location information input by a user (e.g., a zip code or street address), or otherwise acquired by the computer-based systems 925. The physical location of physical objects referenced by elements or objects of one or more computer-based systems 925 may be stored for future reference. Proximity of a user to a second user, or to physical objects referenced by elements or objects of the computer-based application, may be inferred. The length of time, or duration, at which one or more users reside in a particular location may be used to infer intensity of interests associated with the particular location, or associated with objects that have a relationship to the physical location. Derivative mobility inferences or calculations may be made from location and time data, such as the direction of the user, the speed between locations or the current speed, the likely mode of transportation used, and the like. These derivative mobility inferences may be made in conjunction with geographic contextual information or systems, such as through interaction with digital maps or map-based computer systems. Environmental conditions may include the time of day, the weather, lighting levels, sound levels, and any other condition of the environment around the one or more users 200.

In addition to the usage behavior categories depicted in Table 1, usage behaviors may be categorized over time and across user behavioral categories. Temporal patterns may be associated with each of the usage behavioral categories. Temporal patterns associated with each of the categories may be tracked and stored by the adaptive computer-based application 925. The temporal patterns may include historical patterns, including how recently an element, object or item of content associated with adaptive computer-based application 925. For example, more recent behaviors may be inferred to indicate more intense current interest than less recent behaviors.

Another temporal pattern that may be tracked and contribute to preference inferences that are derived is the duration associated with the access or interaction with the elements, objects or items of content of the adaptive computer-based application 925, or the user's physical proximity to physical objects referenced by system objects of the adaptive computer-based application 925, or the user's physical proximity to other process participants. For example, longer durations may generally be inferred to indicate greater interest than short durations. In addition, trends over time of the behavior patterns may be captured to enable more effective inference of interests and relevancy. Since adaptive recommendations 910 may include one or more elements, objects or items of content of the adaptive computer-based application 925, the usage pattern types and preference inferencing may also apply to interactions of the one or more process participants with the adaptive recommendations 910 themselves.

Adaptive Knowledge Lifecycle Management Services and Solutions

In accordance with some embodiments of adaptive knowledge lifecycle management, FIG. 1A depicts a process flow associated with an adaptive knowledge lifecycle process 1000. In some embodiments, an adaptive knowledge lifecycle process is defined to have four phases 1000. The first phase 1010 is the knowledge acquisition phase. This phase encompasses activities related to the development or acquisition of information or knowledge. The second phase is the knowledge architecture phase 1020. This phase encompasses designing and implementing structures to effectively manage information or knowledge. The third phase is the knowledge distribution phase 1030. This phase encompasses distributing information or knowledge to processes, systems, Web-sites, or other media in which the information is accessed and/or processed by one or more users. The fourth phase is the adaptive delivery and management phase 1040. This phase encompasses contextualized delivery of information or knowledge to one or more users or process participants. This phase also encompasses managing the lifecycle of information or knowledge based on the inferred value of the information or knowledge, which may be derived, at least in part, from explicit or inferred user preferences or interests. The adaptive delivery and management phase 1040 may provide input 1041 to the previous phases, thus constituting a feedback loop.

It will be understood that in other embodiments that knowledge lifecycle phases may be labeled or categorized differently.

Figure 1B:
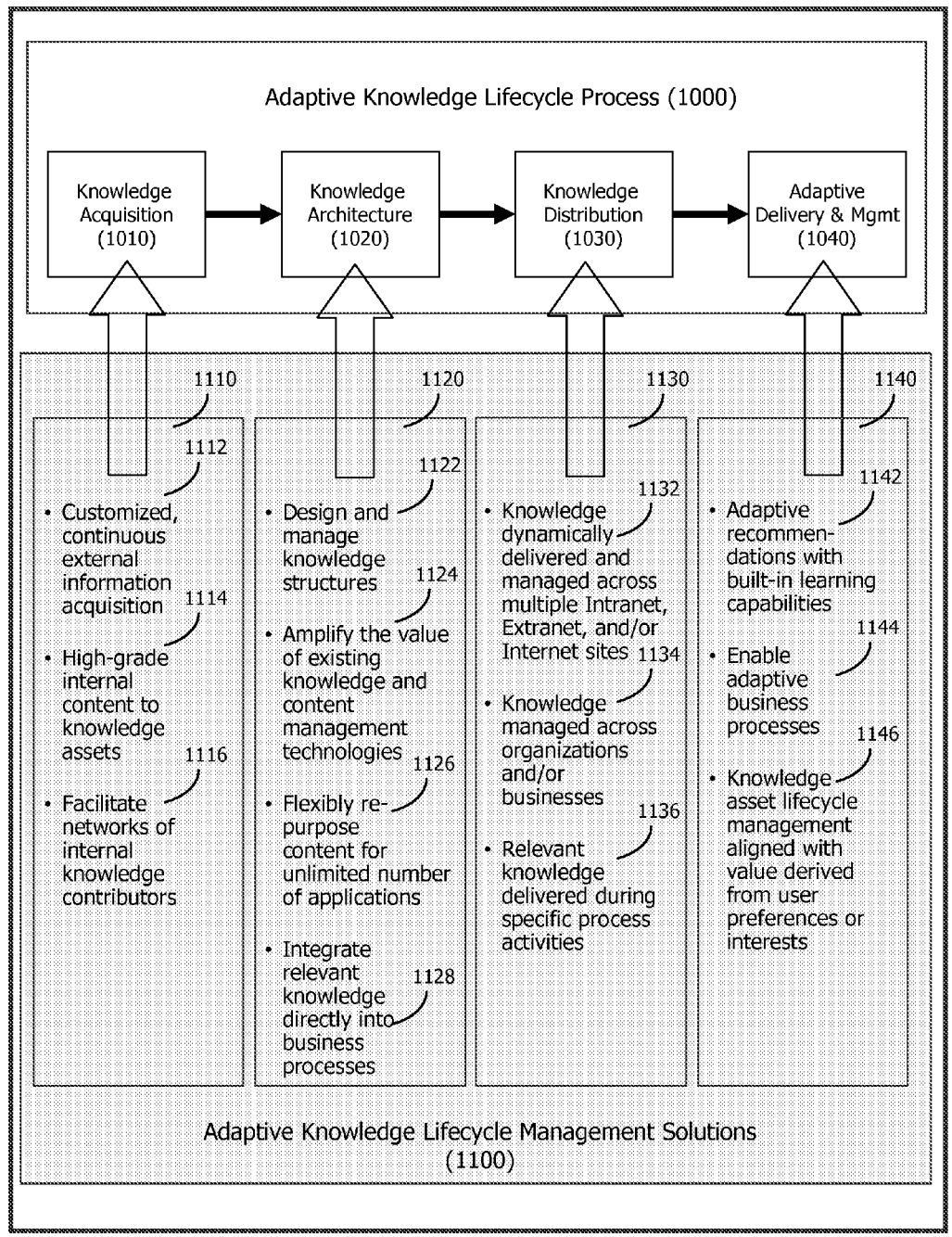
FIG. 1B is a block diagram of an adaptive knowledge lifecycle management service model, according to some embodiments.

In accordance with some embodiments of adaptive knowledge lifecycle management, FIG. 1B depicts an overall service provisioning model associated with a first organization supplying lifecycle management services to a second organization.

Adaptive knowledge lifecycle management solutions 1100 represent a set of services that one or more companies or individuals (which may be designated hereinafter "supplier") provide to support the management of knowledge lifecycle process 1000 of another company, organization, or individual (which may be designated hereinafter "customer").

In some embodiments, adaptive knowledge lifecycle management solutions 1100 is comprised of four categories of services, each category corresponding to a phase of the knowledge lifecycle 1000.

A first category of services 1110 relates to the knowledge acquisition phase 1010 of the knowledge lifecycle 1000. Knowledge acquisition services 1110 may include customized external information acquisition 1112, which may be delivered to the customer organization on a periodic or continuous basis. Knowledge acquisition services 1102 may include scanning and/or monitoring of content from one or more sources, may include filtering the content for quality and/or relevancy, and may include adding corresponding meta-information such as a review or overview, information on source, author, publish date, etc., and rankings, based on attributes such a quality, relevancy to the customer, etc.

Knowledge acquisition services 1110 may include "high grading" the customer's internal content to knowledge assets 1114. This may include scanning and/or monitoring of content from one or more internal sources, may include filtering the content for quality and/or relevancy, and may include adding corresponding meta-information such as a review or overview, information on source organization, author, publish date, etc., and rankings, based on attributes such as quality, relevancy for various purposes, etc.

Knowledge acquisition services 1110 may include facilitating networks of customer internal knowledge contributors 1116. This may include organizing the contributors, providing training, guidelines, and/or editorial support to the internal knowledge contributors.

A second category of services 1120 relates to the knowledge architecture phase 1020 of the knowledge lifecycle 1000. Knowledge architecture services 1120 may include design and management of knowledge structures 1122. Design and management of knowledge structures 1122 may include designing the topology of a plurality of items of information or knowledge assets, including designing relationships among the information or knowledge assets, and may include determining physical storage locations for information or knowledge assets. The topology or structure associated with a plurality of knowledge assets may include hierarchical models, relational models, or network models. Network-based topologies may be fuzzy (the relationship or relationships between any two objects may vary by degree) or non-fuzzy (the relationship or relationships between any two objects either exist or do not exist).

Knowledge architecture services 1120 may include enhancing or amplifying the value of existing customer information, content, and/or knowledge assets 1124. Enhancing or amplifying the value of existing customer information, content, and/or knowledge assets 1124 may include applying designs that seek to maximize information, content, and/or knowledge asset value through development of structures in which consumers of the knowledge assets that would derive the most value from one or more knowledge assets are able to most easily access or otherwise interact with the one or more knowledge assets.

Knowledge architecture services 1120 may include flexibly re-purposing content or knowledge assets for an unlimited number of applications 1126. Flexibly re-purposing content or knowledge assets for an unlimited number of applications 1126 may include designing or managing a plurality of content or knowledge assets and an associated topology so as to maximize content or knowledge asset re-use for multiple purposes or application areas.

Knowledge architecture services 1120 may include integrating relevant knowledge directly into business processes 1128. Integrating relevant knowledge directly into business processes 1128 may include identifying knowledge requirements of a business process and designing knowledge structures so that the required knowledge is accessible during operation of the business process.

A third category of services 1130 relates to the knowledge distribution phase 1030 of the knowledge lifecycle 1000. The knowledge distribution services 1130 may include dynamically delivering and managing knowledge across multiple Intranet, Extranet, and/or Internet sites 1132. Dynamically delivering and managing knowledge across multiple Intranet, Extranet, and/or Internet sites 1132 may include applying a computer-based system that automatically or semi-automatically delivers knowledge assets to Web-sites that may be accessed by a browser.

The knowledge distribution services 1130 may include managing knowledge across organizations and/or businesses 1134. Managing knowledge across organizations and/or businesses 1134 may include applying a computer-based system to maintain appropriate security and controls, and managing organization or business-specific knowledge assets, and/or organization or business-specific user interfaces.

The knowledge distribution services 1130 may include delivering relevant knowledge during specific process activities 1136. Delivering relevant knowledge during specific process activities 1136 may include applying a computer-based system to deliver relevant knowledge assets to process participants, based, at least in part, on system usage behaviors of one or more of the process participants.

A fourth category of services 1140 relates to the adaptive knowledge delivery and management phase 1040 of the knowledge lifecycle 1000. The adaptive knowledge delivery and management services may include applying computer-based adaptive recommendations that include built-in learning capabilities 1142. Applying computer-based adaptive recommendations that include built-in learning capabilities 1142 may include applying a search and/or recommendation engine that learns to become more effective over time through the inferencing of customer user preferences and interests based, at least in part, on the historical usage behaviors of one or more users. In some embodiments, the recommendation engine may be applied to update computer-based systems and/or content, thereby making adaptive, and persistent, modifications to the customers' systems and/or content.

The adaptive knowledge delivery and management services 1140 may include enabling adaptive business processes 1144. Enabling adaptive business processes 1144 may include delivering adaptive recommendations to process participants, and/or may include making adaptive, and persistent, modifications to the systems and/or content that support the processes.

The adaptive knowledge delivery and management services 1140 may include aligning asset lifecycle management with knowledge asset values derived, at least in part, from user preferences or interests 1146. In some embodiments, the user preferences or interests are inferred, at least in part, from system usage behaviors.

Knowledge Asset Valuation

In accordance with some embodiments of adaptive knowledge lifecycle management, valuation of knowledge assets and the corresponding organizing topology knowledge assets may be conducted. The valuation may be conducted as an element of adaptive lifecycle management solutions 1100.

In some embodiments the valuation of knowledge assets may be conducted through application of "network effect" modeling. That is, the knowledge assets and their organizing topology are modeled as a network, where knowledge assets represent nodes in the network, and the organizing topology is manifested as relationships among the knowledge assets (nodes). In the prior art, network effect models have been applied to obvious networks such as telecom networks, the Internet, etc., to provide rough estimates of value, or at least, relative value. The present invention goes beyond the prior art by modeling general computer-based assets of an organization as a network, where the nodes represent any computer-based unit of information, such as documents, multi-media, interactive applications, models, and transactional information. The level of abstraction may be varied for different valuation purposes. For example, a database may be considered a node among a network of other databases. Alternatively, or in addition, the data elements of a database may be considered nodes.

Network effect modeling provides a means of estimating value of networks as additional linked nodes are added. The classic network effect model is Metcalfe's law, which estimates the value of a network to be roughly proportional $N^2$ (or more precisely $((N^2-N)/2)$), where N is the number of nodes in the network. Metcalfe's law implicitly assumes the value of all relationships within the network are equal. This will infrequently be a good assumption for networks of general knowledge assets—for most applications it will be an over-estimate.

Rather, information locality effects will inevitably be important for most types of networks; that is, a node that in some sense or dimension is "closer" is likely to be more valuable. In such cases, value will increase more than linearly as nodes are added to the network, but less than for Metcalfe's law. A preferred network effect model for application to general collections of knowledge assets is:

$$\text{Network value} = N \ln(N), \quad (1)$$

where N is the number of nodes, and "ln" is the natural logarithm (the logarithm may be any other base without loss of generality). It will be appreciated that variations of formula (1) may be applied by the present invention as well. The rationale for the N ln(N) network effect model is described in the white paper "A Refutation of Metcalfe's Law and a Better Estimate for the Value of Networks and Network Interconnections," Odlyzko and Tilly, 2005. This model provides more sensible results for valuing alternative configurations or topologies on general knowledge assets. Network value models of the N ln N type, or variants thereof, are consistent with a network locality factor consistent with Zipf's law, which has been found to effectively model the locality factors of a variety of real-world networks.

In some embodiments, an automated system may be applied to determine the knowledge assets and organizing topology. This automated system may then compute a value for the collection of knowledge assets directly, or serve as input to a second system that computes the value. The system may be applied to generate a base line value, and may also be applied to generate a new value after the organizing topology has been modified.

An alternative or additional valuation modeling approach that may be applied by the present invention is the application of modeling techniques derived from experimental design. This method makes the underlying assumption that knowledge assets have value to the extent they provide information that can influence one or more decisions.

A simple model experimental design model presented in the book "Experimentation Matters", Thomke, 2003, and with more detail provided in the paper "Sequential Testing in Product Development", Thomke and Bell, 2001, is:

$$\text{Optimal Number of Test Rounds} = (a/t)^{0.5} \quad (2)$$

where "a" is the avoidable cost (or alternatively, value) if problems (or alternatively, opportunities) are found earlier, and "t" is the cost of one round of tests.

In other words, this formula balances the cost of tests or information gathering versus the expected benefits of the test results (or more generally, information) in improving decision making. Therefore, formula (2) may be extended to derive the expected value of test information by assuming that since the cost of the tests at the margin must equal the benefits or value of the testing given rationale investment in testing (or more generally, information), then:

$$\text{Value of Information} = ((a/t_0)^{0.5}) * t_0 \quad (2a)$$

where "$t_0$" represents the initial unit cost of a test, experiment, or most broadly, an item of information.

The present invention extends beyond the prior art by extending the formula (2), or variations thereof, to any collection of knowledge assets through application of formula (2a). If the cost of accessing and making use of the knowledge assets can be modeled as contributing to decisions, then organizing topologies, access and/or processing methods, and analytical methods that effectively decrease the cost of applying the knowledge assets to decisions enables use of formula (2a) to derive estimates of aggregate knowledge asset value.

To derive the impact of information or knowledge asset cost reductions on knowledge asset valuation, it is first assumed that the unit cost of accessing and/or applying an item of information is reduced to $t_1$. Using formula (2a) as a baseline, we can compute the value of information cost reduction by decomposing information cost reduction into an efficiency effect and an effectiveness effect as follows:

Efficiency Value Ratio of Information Cost Reduction
$$t_1 = (((a/t_0)^{0.5}) * t_1) / (((a/t_0)^{0.5}) * t_0) = t_1/t_0 \quad (2b)$$

Therefore, if information costs are reduced by 50%, then the efficiency value is increased by about 50%, as the same original value is generated at half the cost.

However, there is also an increased effectiveness value that relates to an increased number of tests (or use of information) that is applied as the cost of the tests or information is decreased. That value is calculated as follows:

Effectiveness Value Ratio of Information Cost Reduction $t_1 = ((((a/t_1)^{0.5}) * t_1) - (((a/t_0)^{0.5}) * t_1)) / (((a/t_0)^{0.5}) * t_0)$ \quad (2c)

So, in other words, if information costs are reduced by 50%, then the effectiveness value is increased by about 20%. Therefore the total value of information cost reduction of 50% per unit of information generates about an extra 70% of value.

The network effect models, as exemplified by formula (1) represent an information relationship-based approach to aggregate knowledge asset valuations. The experimental design models, as exemplified by formula (2a), represent a decision analytic/cost of information approach to aggregate knowledge asset valuations. The present invention provides novel benefits versus the prior art in applying either of these two approaches to general knowledge asset valuation. Further, the present invention may use these approaches in combination to generate knowledge asset valuations.

Both approaches are most effective in generating a relative change in value versus a baseline value. In some embodiments, the baseline value of a collection of knowledge assets may be determined from financial analysis of the organization associated with the knowledge assets. For example, the financial returns, measured as a net present value or other financial return metric, of a collection of knowledge assets may be determined, either retrospectively or prospectively. This may serve as a baseline on which the results of knowledge asset valuation models based on network effects and/or experimental design are applied.

Computer-Based Implementations of Adaptive Knowledge Lifecycle Management

Figure 2:
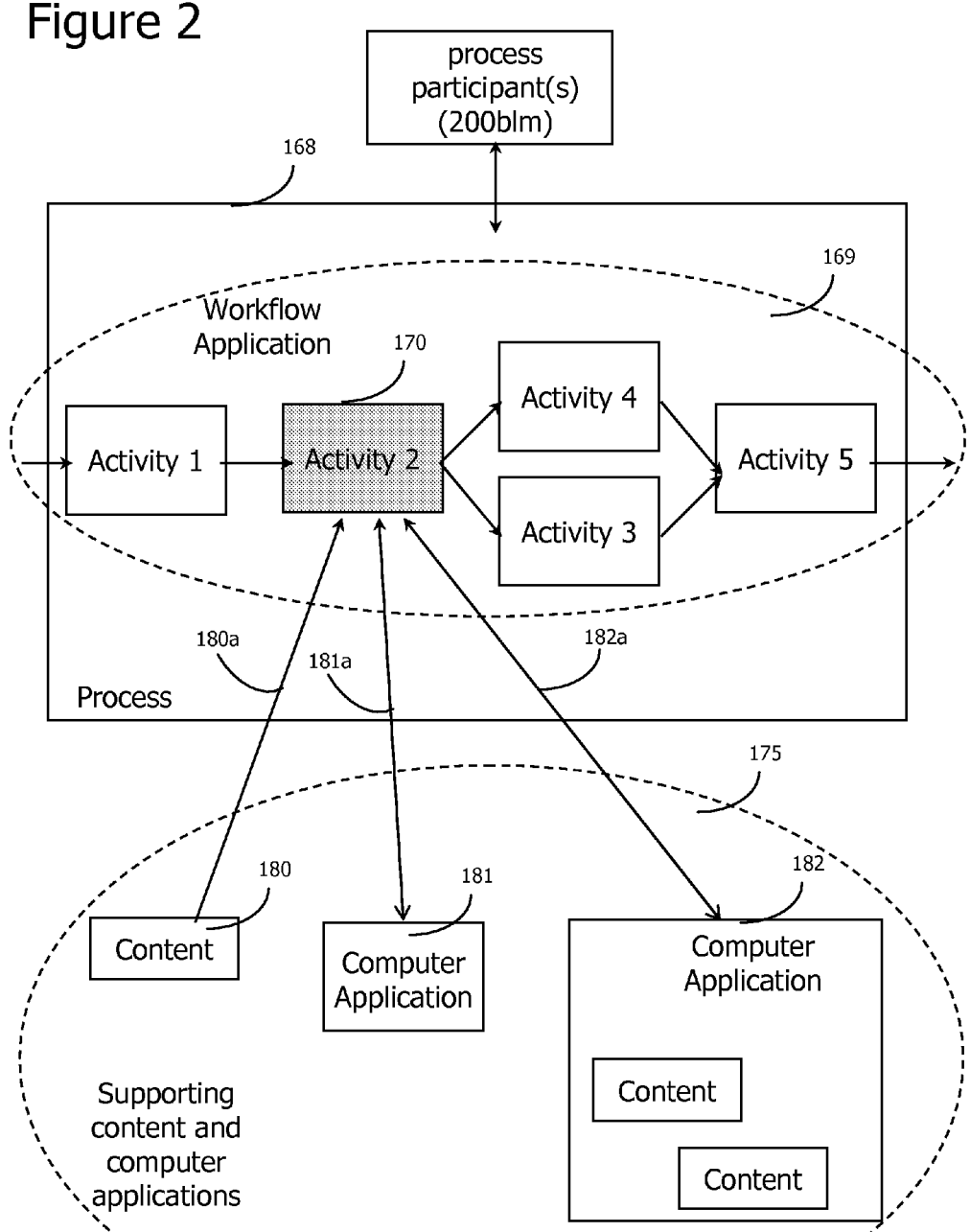
FIG. 2 is a block diagram describing a knowledge lifecycle management process and associated supporting content and computer applications, according to some embodiments.

FIG. 2 illustrates a general approach to information and computing infrastructure support for implementation of a general business process by a computer application-supported process. Some or all of the elements of the adaptive knowledge lifecycle management solutions 1100 may be applied to support a customer's business process. The elements of the adaptive knowledge lifecycle management solutions 1100 may include activities, procedures, frameworks, models, algorithms, and sub-processes, and may map to customer process activities, sub-processes, processes, and/or workflow. It should be understood that FIG. 2 represents an exemplary process instantiation of a customer's process.

In FIG. 2, the workflow of activities within a process or sub-process 168 may be managed by a computer-based workflow application 169 that enables the appropriate sequencing of workflow. Each activity, as for example "Activity 2" 170, may be supported by on-line content or computer applications 175. On-line content or computer applications 175 include pure content 180, a computer application 181, and a computer application that includes content 182. Information or content may be accessed by the sub-process 168 from each of these sources, shown as content access 180a, information access 181a, and information access 182a.

For example, content 180 may be accessed 180a (a content access 180a) as an activity 170 is executed. The term "content", or alternatively, knowledge assets, is defined broadly herein, to include text, graphics, video, audio, multi-media, computer programs or any other means of conveying relevant information. During execution of the activity 170, an interactive computer application 181 may be accessed. During execution of the activity 170, information 181a may be delivered to, as well as received from, the computer application 181. A computer application 182, accessible by participants 200blm in the knowledge lifecycle management process during execution of the activity 170, and providing and receiving information 182a during execution of the activity 170, may also contain and manage content such that content and computer applications and functions that support an activity 170 may be combined within a computer application 182. An unlimited number of content and computer applications may support a given activity, sub-process or process. A computer application 182 may directly contain the functionality to manage workflow 169 for the sub-process 168, or the workflow functionality may be provided by a separate computer-based application.

Figure 3:
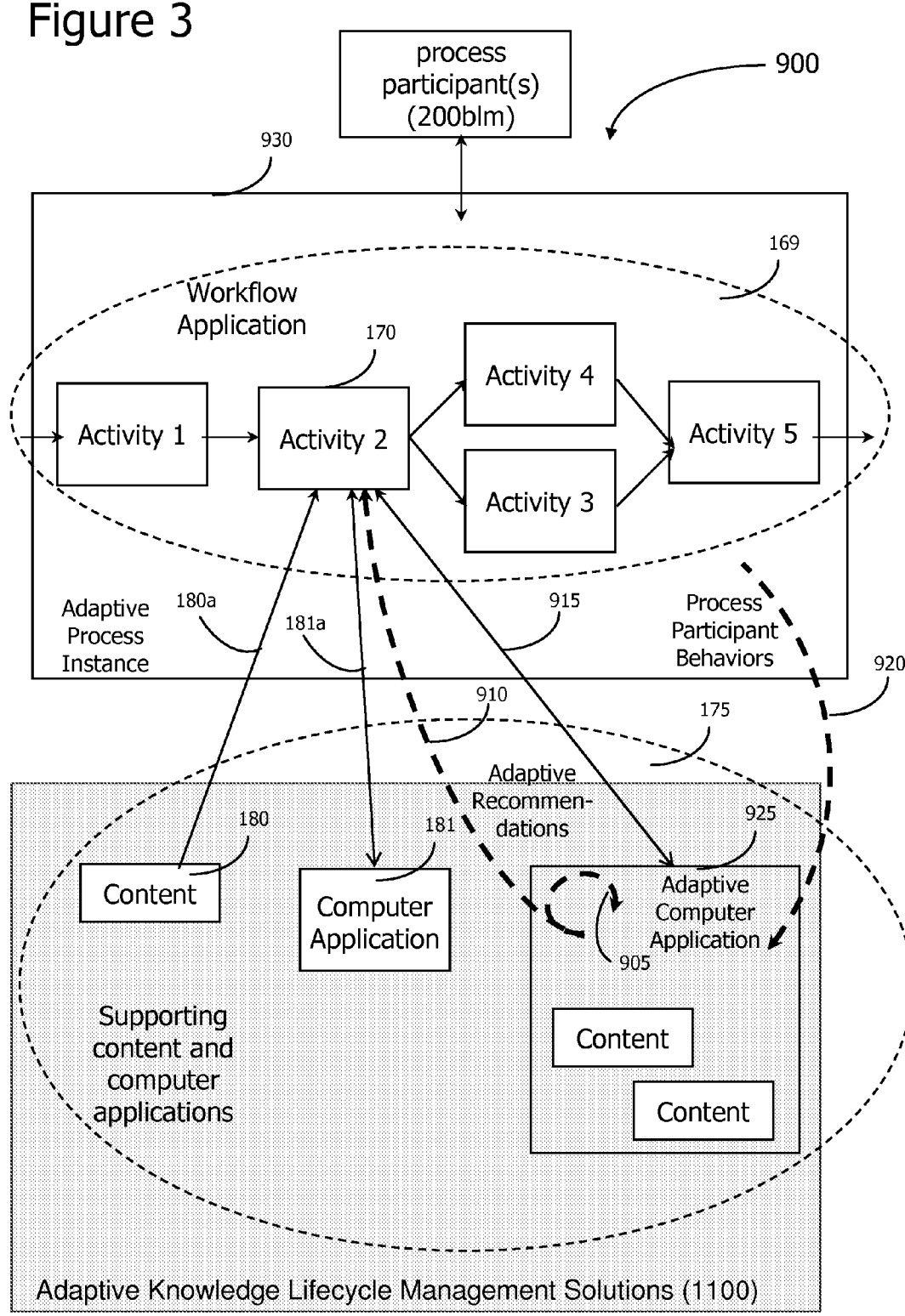
FIG. 3 is a block diagram describing an adaptive knowledge lifecycle management process and associated supporting content and computer applications, according to some embodiments.

FIG. 3 depicts the application of adaptive knowledge lifecycle management solutions 1100 to support a process or sub-process, according to some embodiments. Adaptive knowledge lifecycle management solutions 1100 may apply the methods and systems disclosed in PCT Patent Application No. PCT/US2005/011951, entitled "Adaptive Recombinant Processes," filed on Apr. 8, 2005, which is hereby incorporated by reference as if set forth in its entirety.

In FIG. 3, the adaptive knowledge lifecycle management process 900 may include many of the features of the computer-supported process in FIG. 2. Thus, the adaptive process instance 930 features the workflow application 169, if applicable, with multiple activities 170, one or more of which may be linked. Further, the adaptive computer-based application 925 is depicted as part of supporting content and computer applications 175.

One or more participants 200blm in the adaptive process instance 930 generate behaviors associated with their participation in the process instance 930. The participation in the process instance 930 may include interactions with computer-based systems 181 and content 180, such as content access 180a and information access 181a, but may also include behaviors not directly associated with interactions with computer-based systems or content.

Process participants 200blm may be identified by the adaptive computer-based application 925 through any means of computer-based identification, including, but not limited to, sign-in protocols or bio-metric-based means of identification; or through indirect means based on identification inferences derived from selective process usage behaviors 920.

The adaptive knowledge lifecycle management process 900 includes an adaptive computer-based application 925, which includes one or more system elements or objects, each element or object being executable software and/or content that is meant for direct human access. The adaptive computer-based application 925 tracks and stores selective process participant behaviors 920 associated with a process instance 930. It should be understood that the tracking and storing of selective behaviors by the adaptive computer-based application 925 may also be associated with one or more other processes, sub-processes, and activities other than the process instance 930. In addition to the direct tracking and storing of selective process usage behaviors, the adaptive computer-based application 925 may also indirectly acquire selective behaviors associated with process usage through one or more other computer-based applications that track and store selective process participant behaviors.

FIG. 3 also depicts adaptive recommendations 910 being generated and delivered by the adaptive computer-based application 925 to process participants 200blm. The adaptive recommendations 910 are shown being delivered to one or more process participants 200blm engaged in "Activity 2" 170 of the adaptive process instance 930 in FIG. 4B. It should be understood that the adaptive recommendations 910 may be delivered to process participants 200blm during any activity or any other point during participation in a process or sub-process.

The adaptive recommendations 910 delivered by the adaptive computer-based application 925 are informational or computing elements or subsets of the adaptive computer-based application 925, and may take the form of text, graphics, Web sites, audio, video, interactive content, other computer applications, or embody any other type or item of information. These recommendations are generated to facilitate participation in, or use of, an associated process, sub-process, or activity. The recommendations are derived by combining the context of what the process participant is currently doing and the inferred preferences or interests of the process participant based, at least in part, on the behaviors of one or more process participants, to generate recommendations. As the process, sub-process or activity is executed more often by the one or more process participants, the recommendations adapt to become increasingly effective. Hence, the adaptive knowledge lifecycle management process 900 can adapt over time to become increasingly effective.

Furthermore, the adaptive recommendations 910 may be applied to automatically or semi-automatically self-modify 905 the structure, elements, objects, content, information, or software of a subset 1632 of the adaptive computer-based application 925, including representations of process workflow. For example, the elements, objects, or items of content of the adaptive computer-based application 925, or the relationships among elements, objects, or items of content associated with the adaptive computer-based application 925 may be modified 905 based on inferred preferences or interests of one or more process participants. These modifications may be based solely on inferred preferences or interests of the one or more process participants 200blm derived from process usage behaviors, or the modifications may be based on inferences of preferences or interests of process participants 200blm from process usage behaviors integrated with inferences based on the intrinsic characteristics of elements, objects or items of content of the adaptive computer-based application 925. These intrinsic characteristics may include patterns of text, images, audio, or any other information-based patterns.

For example, inferences of subject matter based on the statistical patterns of words or phrases in a text-based item of content associated with the adaptive computer-based application 925 may be integrated with inferences derived from the process usage behaviors of one or more process participants to generate adaptive recommendations 910 that may be applied to deliver to participants in the process, or may be applied to modify 905 the structure of the adaptive computer-based application 925, including the elements, objects, or items of content of the adaptive computer-based application 925, or the relationships among elements, objects, or items of content associated with the adaptive computer-based application 925.

Structural modifications 905 applied to the adaptive computer-based application 925 enables the structure to adapt to process participant preferences, interests, or requirements over time by embedding inferences on these preferences, interests or requirements directly within the structure of the adaptive computer-based application 925 on a persistent basis.

Adaptive recommendations generated by the adaptive computer-based application 925 may be applied to modify the structure, including objects and items of content, of other computer-based systems 175, including the computer-based workflow application 169, supporting, or accessible by, participants in the process instance 930. For example, a system that manages workflow 169 may be modified through application of adaptive recommendations generated by the adaptive computer-based application 925, potentially altering activity sequencing or other workflow aspects for one or more process participants associated with the adaptive process instance 930.

In addition to adaptive recommendations 910 being delivered to process participants 200blm, process participants 200blm may also access or interact 915 with adaptive computer-based application 925 in other ways. The access of, or interaction with, 915 the adaptive computer-based application 925 by process participants 200blm is analogous to the interactions 182a with computer application 182 of FIG. 2. However, a distinguishing feature of adaptive process 900 is that the access or interaction 915 of the adaptive computer-based application 925 by process participants 200blm may include elements 1632 of the adaptive computer-based application 925 that have been adaptively self-modified 905 by the adaptive computer-based application 925.

As shown in FIG. 3, it should be noted that at least some, but not necessarily all, of computer-based applications and content 175 supporting process 930 are included in adaptive knowledge lifecycle management solutions 1100.

Recall from FIG. 3 that the adaptive computer-based application 925 may integrate with existing and/or new online computer applications 175 to enable capture and analysis of usage behavior information 920. This information may then be used to determine the value of the online computer and software assets, or most broadly, knowledge assets. This determination of value of online assets can then be applied beneficially to facilitate asset management processes associated with the on-line assets, optionally including applying a function to automatically or semi-automatically modify the one or more computer applications 175 in alignment with the inferred value of the online assets of computer applications 175 to process participants 200.

Figure 4:
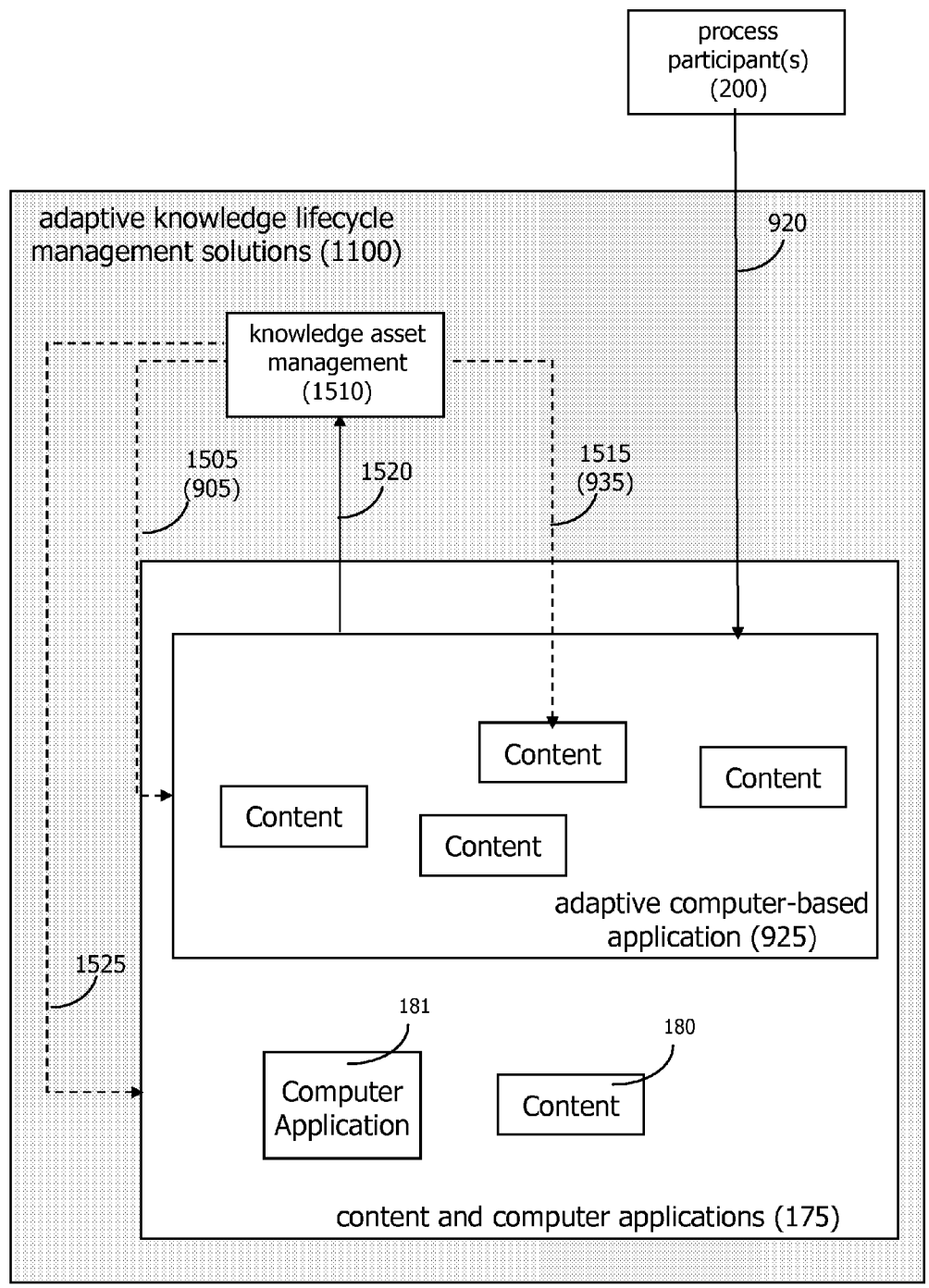
FIG. 4 is a block diagram of an adaptive knowledge asset management system and process, according to some embodiments.

FIG. 4 depicts an aspect of adaptive knowledge lifecycle management solutions 1100 in generating values of individual or collections of knowledge assets, and automatically managing the knowledge assets consistent with their valuation. The asset management system 1500 includes the adaptive computer-based application 925 and a knowledge asset management function 1510. Although in FIG. 4, the knowledge asset management function 1510 is shown to be external to the adaptive computer-based application 925, it should be understood that the asset management function 1510 may be configured to be internal to the adaptive computer-based application 925.

The knowledge asset management function 1510 receives information 1520 associated with data regarding the usage behaviors 920 of process participants 200, or inferences of the preferences and interests of online assets associated with the process participant usage behaviors 920. The knowledge asset management function 1510 uses the information 1520 to derive the value of online assets. The derived value may be of different magnitudes for different individuals or communities of process participants 200. The asset valuation information determined by the knowledge asset management function 1510 may be applied to decide near-term or long-term online asset changes and directions. For example, a high-value on-line asset might be made more prominently available for process participants 200, while less valuable assets might be made less prominent, or eliminated from the content and computer applications 175. New development projects to deliver on-line assets that are expected to be of high value based on the valuations of the asset management function 1510 may be conducted. Further, in addition to on-line assets, features associated with the assets may be evaluated by the knowledge asset management function 1510, and appropriate asset modifications or development projects initiated. For some modifications, the knowledge asset management function 1510 may be used to support making the appropriate changes.

The knowledge asset management function 1510 may automatically or semi-automatically modify 1505 the adaptive computer-based application 925. For alternative embodiments in which the asset management function 1510 is internal to the adaptive computer-based application 925, the adaptive self-modification operation 1505 is analogous to the structural modifications 905 of the adaptive computer-based application 925, described above. Likewise, the asset management function 1510 may automatically or semi-automatically modify 1515 content within adaptive computer-based application 925. For embodiments in which the asset management function 1510 is internal to the adaptive computer-based application 925, the adaptive self-modification of content 1515 is analogous to the content-based modifications 935, 905 of the aforementioned system 925 (represented in parentheses). Further, other computer applications and content 175 may be automatically or semi-automatically modified 1525 by the knowledge asset management function 1510 in accordance with valuations derived by knowledge asset management function 1510. In such cases, even if direct usage behavioral information 920 are not available for non-adaptive computer application 181 and content 180, the asset management function 1510 may make inferences based on analogy from interactions of the process participants 200 with the adaptive computer-based application 925 to generate appropriate valuations.

Note that adaptive recommendations 910 delivered to process participants 200 is not an essential feature for adaptive knowledge lifecycle management solutions 1100.

Adaptive Real-Time Learning

The adaptive knowledge lifecycle management solutions 1100 may be used to establish an adaptive process environment 930 to promote enhanced learning by process participants or users 200, including real-time learning, for existing or new processes through the implementation of adaptive recommendations 910 that are delivered directly to the process participant or user 200, or indirectly through adaptive modification of the process network structure 905 or content 935. In some embodiments, the resulting environment may be metaphorically termed an adaptive online "cockpit" of knowledge and activities that effectively "surrounds" the process user. This approach facilitates the real-time learning of process participants or users 200, rather than relying solely or primarily on classroom or other episodic forms of education or training.

Figure 5:
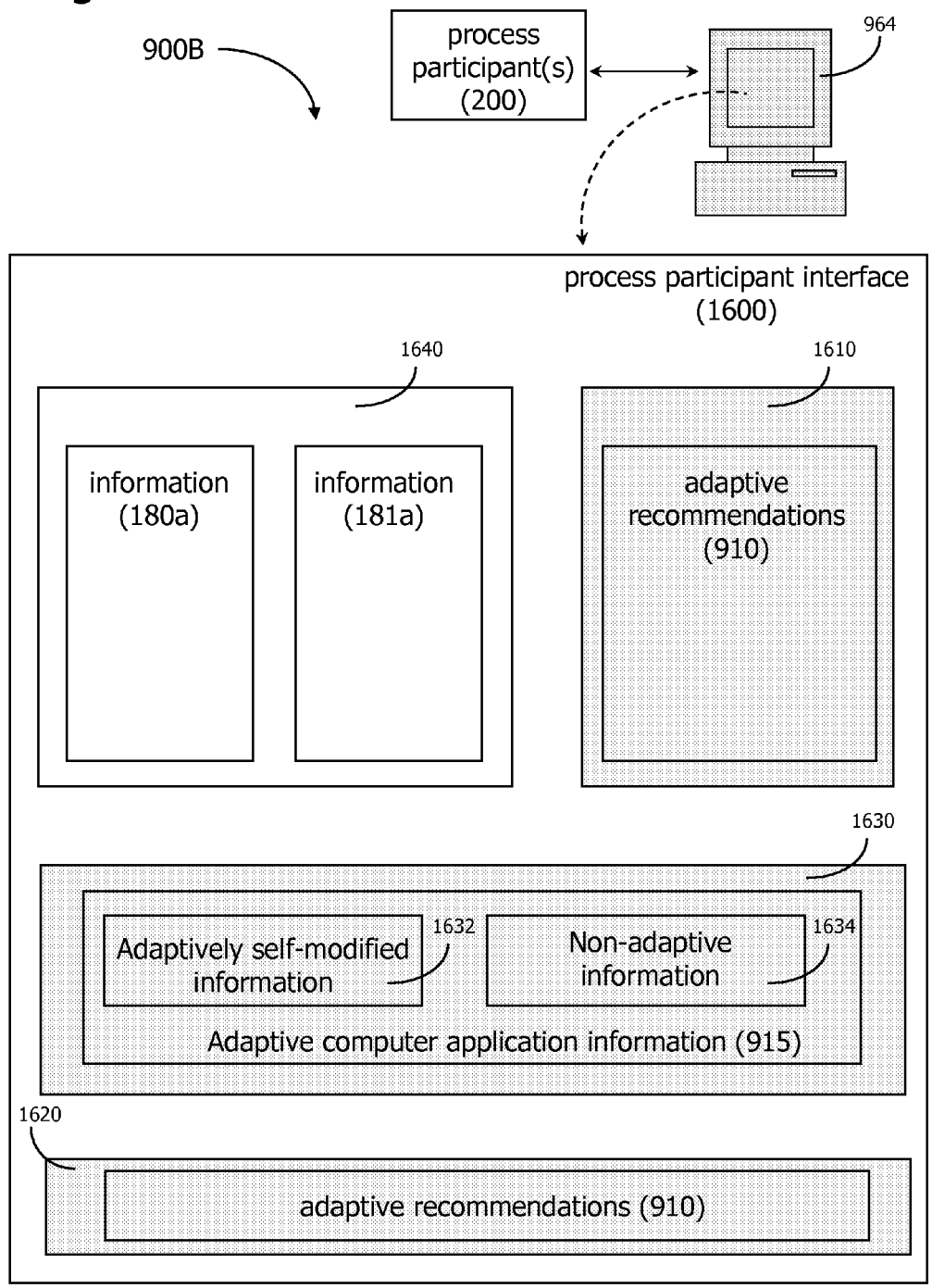
FIG. 5 is a block diagram of an a real-time learning system interface, according to some embodiments.

FIG. 5 illustrates an exemplary process participant interface 1600 associated with a computing device 964 that is interacted with by process participants 200. It should be understood that although FIG. 5 illustrates a visual, display-oriented process participant interface, the interface could be audio-based, tactile or kinesthetically-based, or the interface could be comprised of combinations of visual, audio, or kinesthetic elements. The process participant interface 1600 of the adaptive process 900B may include one or more instances of displayed adaptive recommendations 910 associated with the adaptive computer-based application 925, in which the adaptive recommendations 910 are formatted for viewing in a specified manner. In FIG. 5, a first formatted instance 1610 and a second formatted instance 1620 of adaptive recommendations 910 are shown. The process participant interface 1600 may contain other information 915 derived from the adaptive computer-based application 925, formatted as appropriate for display. A formatted instance 1630 of information 915 from the adaptive computer-based application 925 is shown. A formatted instance 1630 may contain one or more instances of adaptive information 1632 and/or non-adaptive information 1634. Recall from FIG. 3 that adaptive information 1632 is content, structural elements, objects, information, or computer software that has been adaptively self-modified 905, 935 by the adaptive computer-based application 925 based, at least in part, on usage behaviors 920 of process participants 200. Non-adaptive information 1634 denotes any other information, content, objects, or computer software encompassed by the adaptive computer-based application 925 that has not been adaptively self-modified 905, 935.

The process participant interface 1600 may also contain formatted instances 1640 of other information such as information derived from other content 180a and other computer applications 181a that are relevant to process participants 200.

Formatted instances 1610, 1620 of adaptive recommendations 910 and formatted instances of adaptive computer application information 915 may contain explicit educational or training information or content, or relevant references or "help" information, in addition to more general information or content relevant to the associated process. In some embodiments, the adaptive computer-based application 925 may include or interact with a learning management system that may provide guidance on the appropriate educational or training information to include in the adaptive recommendations 910.

Computing Infrastructure

Figure 6:
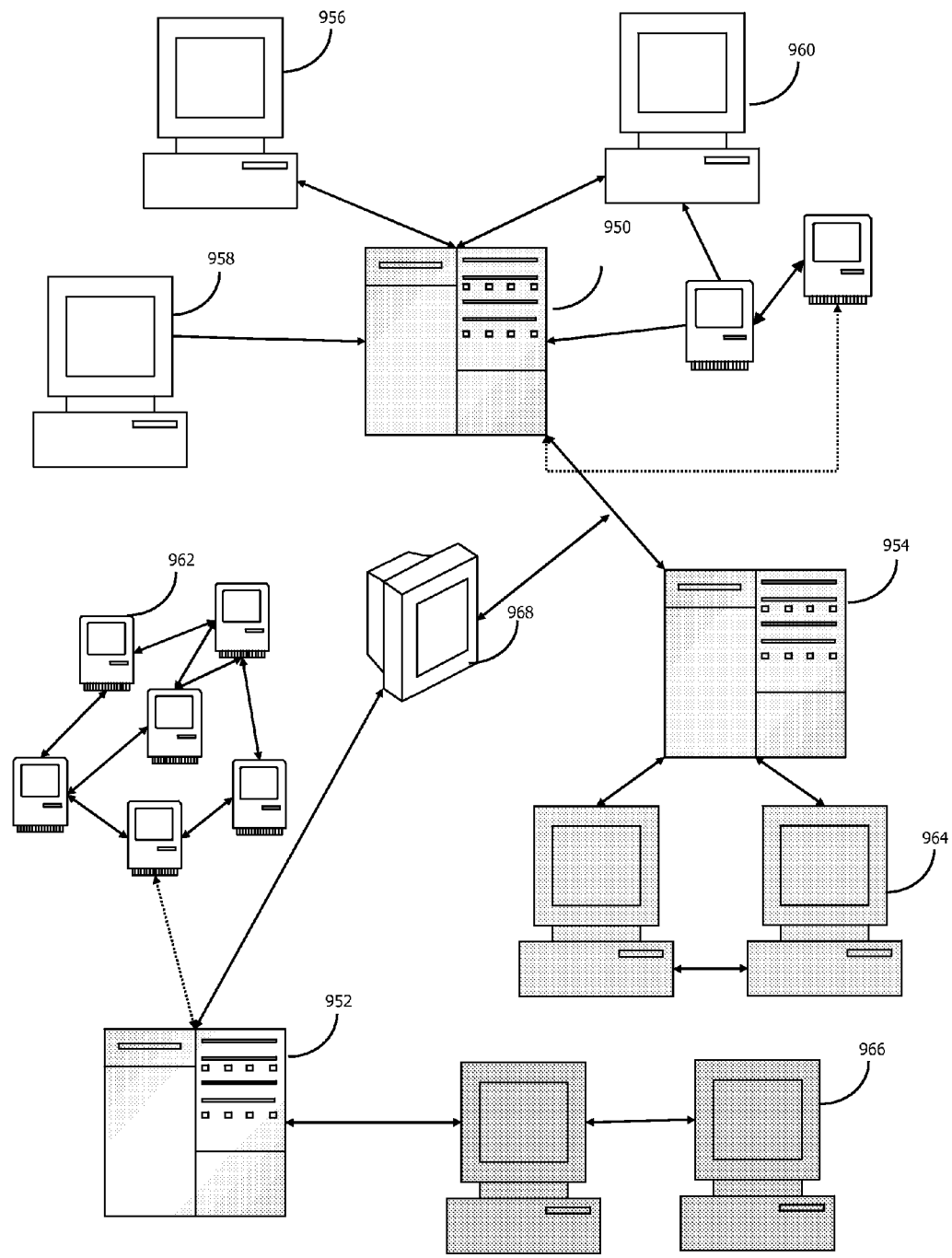
FIG. 6 is a diagram of alternative computing topologies of adaptive recombinant processes, according to some embodiments.

FIG. 6 depicts various hardware topologies that the adaptive knowledge lifecycle management solutions 1100 may embody. Servers 950, 952, and 954 are shown, perhaps residing at different physical locations, and potentially belonging to different organizations or individuals. A standard PC workstation 956 is connected to the server in a contemporary fashion. In this instance, the adaptive knowledge lifecycle management solutions, in part or as a whole, may reside on the server 950, but may be accessed by the workstation 956. A terminal or display-only device 958 and a workstation setup 960 are also shown. The PC workstation 956 may be connected to a portable processing device (not shown), such as a mobile telephony device, which may be a mobile phone or a personal digital assistant (PDA). The mobile telephony device or PDA may, in turn, be connected to another wireless device such as a telephone or a GPS receiver.

FIG. 6 also features a network of wireless or other portable devices 962. The relevant systems of adaptive knowledge lifecycle management solutions 1100 may reside, in part or as a whole, on all of the devices 962, periodically or continuously communicating with the central server 952, as required. A workstation 964 connected in a peer-to-peer fashion with a plurality of other computers is also shown. In this computing topology, the relevant systems, as a whole or in part, may reside on each of the peer computers 964.

Computing system 966 represents a PC or other computing system, which connects through a gateway or other host in order to access the server 952 on which the relevant systems, in part or as a whole, reside. An appliance 968, includes software "hardwired" into a physical device, or may utilize software running on another system that does not itself host the relevant systems. The appliance 968 is able to access a computing system that hosts an instance of one of the relevant systems, such as the server 952, and is able to interact with the instance of the system.

The adaptive knowledge lifecycle management solutions 1100 may utilize database management systems, including relational database management systems, to manage to manage associated data and information, including objects and/or relationships among objects.

Figure 7:
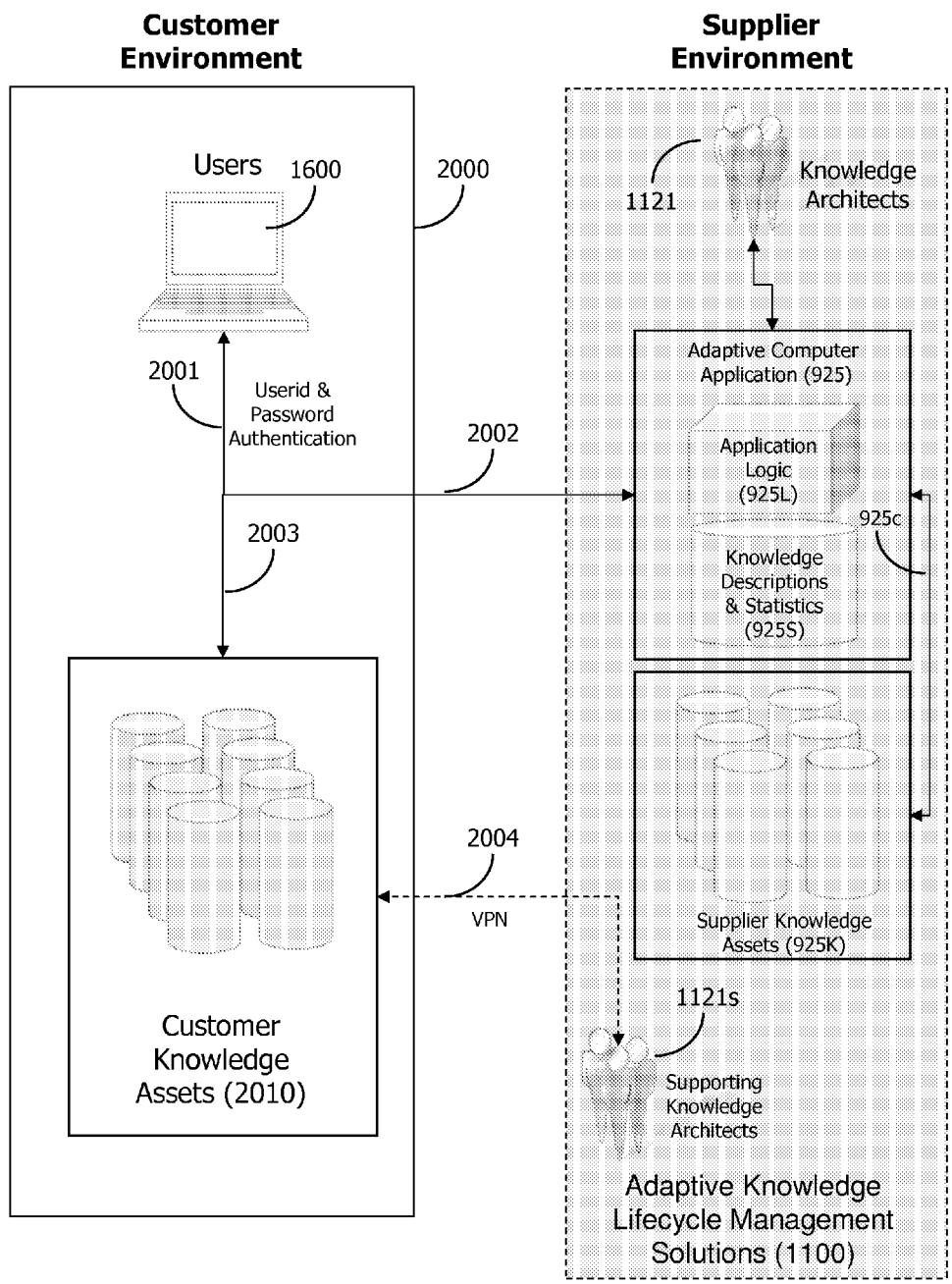
FIG. 7 is a diagram of a web services-based adaptive knowledge lifecycle management technical configuration according to some embodiments.

FIG. 7 represents an exemplary Web Services-based implementation of adaptive lifecycle management solutions 1100. One or more supplier environments include adaptive knowledge lifecycle management solutions 1100, which in turn includes an adaptive computer application 925, supplier-owned knowledge assets 925k, knowledge architects 1121, and knowledge architects that directly support customers 1121s. One or more customer environments include users that access customer knowledge assets 2010 and/or supplier knowledge assets 925k through an adaptive interface 1600 that accesses adaptive computer application 925.

Within adaptive knowledge lifecycle management solutions 1100, adaptive computer-based application 925 is connected 925c to supplier knowledge assets 925k, which may be on the same or different computers, and some or all of the supplier knowledge assets 925k may reside in the customer environment, within the customer firewall 2000. Adaptive computer-based application 925 is comprised of application logic 925l and knowledge asset descriptions and statistics 925s. The knowledge asset descriptions and statistics may include descriptions and/or usage behavior statistics associated with supplier knowledge assets 925k and/or customer knowledge assets 2010. Although in FIG. 7, the knowledge asset descriptions and statistics 925k is shown residing within the supplier environment, some or all of the knowledge asset descriptions and statistics 925k may reside in the customer environment, within the customer firewall 2000.

Knowledge architects 1121 interact with adaptive computer application 925, and thereby manage supplier knowledge assets 925k. Managing the supplier knowledge assets 925k may include adding new knowledge assets, modifying existing knowledge assets, or deleting knowledge assets. Managing supplier knowledge assets may also include modifying the structure, topology and/or relationships among the supplier knowledge assets 925k.

Within the customer environment, users interact with an adaptive interface 1600, which interacts 2001, 2002 with adaptive computer application 925. In some embodiments, the one or more customers access 2002 adaptive computer application 925 through a firewall 2000. In some embodiments, users are authenticated prior to an establishment of a connection 2001 to internal 2003 and/or external computing systems 925 or knowledge assets.

Supporting knowledge architects 1121s within adaptive knowledge lifecycle management 1100 may access customer knowledge assets directly 2004 as shown in FIG. 7 (using, for example, a virtual private access method to access customer knowledge assets 2010 through the customer firewall 2000), or, through adaptive computer application 925. For either access approach, supporting knowledge architects may manage customer knowledge assets 2010. Managing the customer knowledge assets 2010 may include adding new knowledge assets, modifying existing knowledge assets, or deleting knowledge assets. Managing supplier knowledge assets may also include modifying the structure, topology and/or relationships among the customer knowledge assets 2010.

Customer knowledge assets 2010 and supplier knowledge assets 925k may be virtually combined via adaptive computer application 925 to create a combined collection of knowledge assets for customer users. Supporting knowledge architects 1121s may manage this combined collection of knowledge assets.

Knowledge and Content Lifecycle Process Management

Ins some embodiments, adaptive lifecycle management solutions 1100 may apply the methods and systems disclosed in U.S. patent application Ser. No. 11/153,632, entitled "Method for Business Lifecycle Management," filed on Jun. 15, 2005, and in U.S. patent application Ser. No. 11/154,068, entitled "Business Lifecycle Management System," filed on Jun. 15, 2005, which are hereby incorporated by reference as if set forth in their entirety.

Knowledge management, content management, learning processes and communications are all related concepts, and all important to business performance. Communications—the transmission and receipt of information, knowledge or content—underpins most of human affairs.

According to some embodiments, consumers of information or knowledge desire two fundamental qualities: 1) an increasingly large amount of information should be available to them, and 2) they want to be increasingly selective in their consumption of the information. Unfortunately, these two desires generally compete—in other words, there is a trade-off. This simply follows from the fact that, although information is highly valuable, the time of information consumers have is also highly valuable.

The following describes the basic elements of information quantity and selectivity according to some embodiments. First, from an information quantity standpoint, information consumers desire two concurrent qualities: 1) they want breadth of information, and 2) they want depth of information. By breadth, it is meant a boundarylessness of information across categories or domains. By depth, it is meant the ability to get more and more details of information within a category or domain. The key point of both of these information volumetric dimensions is that the fewer boundaries there are, the better—because boundaries are costly for information consumers. When there are boundaries, either information cannot be found at all, or time is wasted in having to jump the boundary to seek related information. Taken together, we can refer to the breadth and depth as the comprehensiveness of a set of information.

According to some embodiments, from the standpoint of information selectivity, information consumers also want two qualities: 1) they want the highest possible quality of information, and 2) they want information that is most relevant to their particular requirements. By quality of information, it is meant that which is the most recent, most authoritative on the subject, and most free of extraneous information. By relevant, it is meant information that is most focused on the consumers' particular requirements—customized for information consumers' particular situation, preferences or interests. Taken together, the combination of quality and relevance can be referred to as the signal-to-noise ratio, echoing communications theory.

Information consumers desire both comprehensiveness and high signal-to-noise rations; however, for any given transmission and/or delivery mode, there is a trade-off between these communications attributes. Given a transmission mode, or more broadly, a communications, knowledge, or content management infrastructure, a choice can be made regarding the best trade-off between comprehensiveness and signal-to-noise. It is only possible to make dual improvements in the attributes by applying more advanced technologies or infrastructures. The fields of publishing, broadcasting, telecommunications and computing are all examples of elements of our communications infrastructure in its broadest sense.

Knowledge and Content Lifecycle Management

Figure 8:
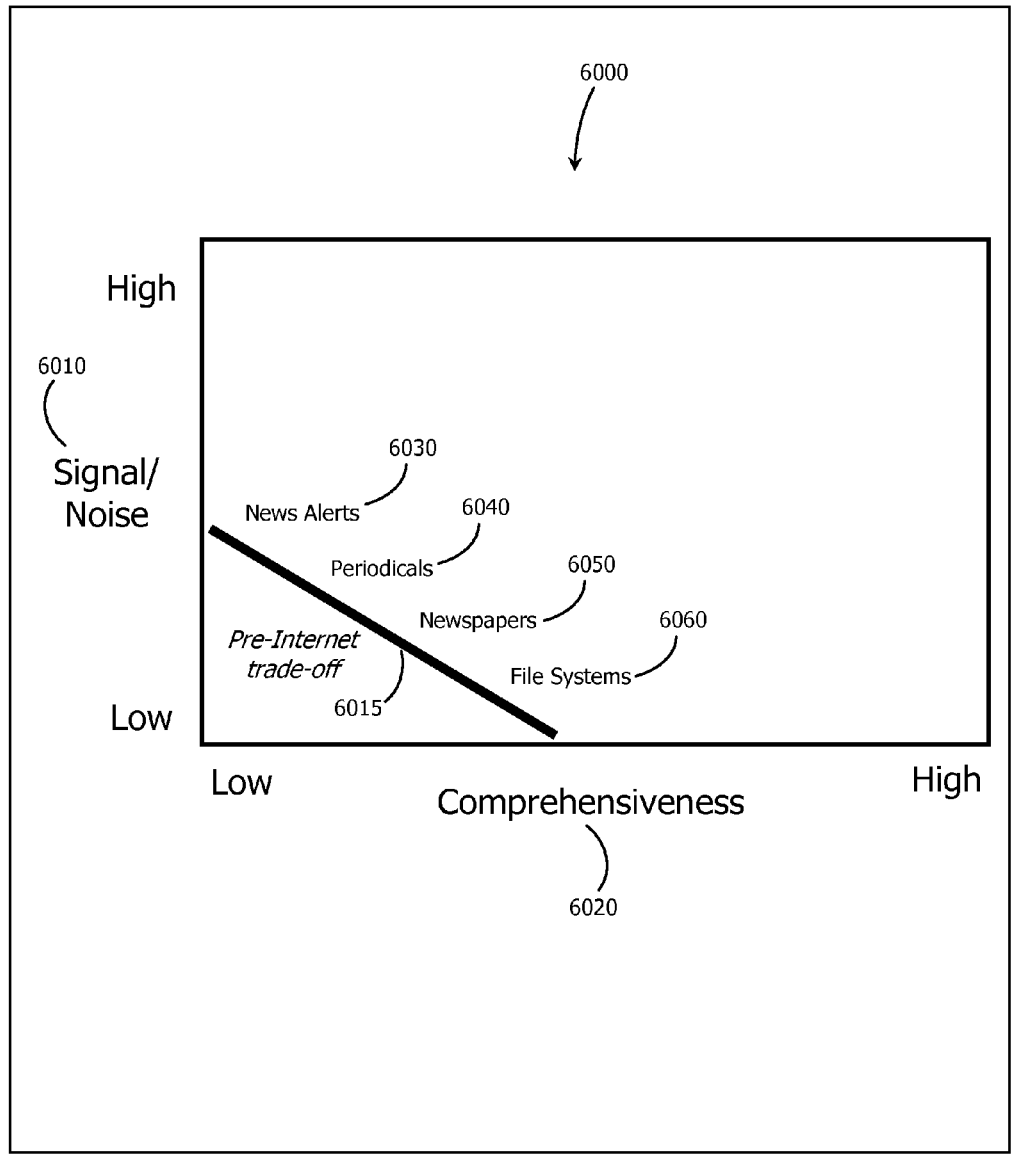
FIG. 8 is a diagram of knowledge and content lifecycle strategy including a knowledge and content lifecycle model according to some embodiments.

According to some embodiments, FIG. 8 depicts a knowledge and content lifecycle model 6000 that applies the dimensions of signal/noise 6010 and comprehensiveness of information 6020, and may be applied as part of adaptive lifecycle management solutions 1100. There have always been trade-offs between comprehensiveness and signal-to-noise ratios, with different information delivery modes optimized for a particular trade-off choice. For example, in publishing, periodicals 6040 are often focused on a particular domain for a particular customer segment, so that the signal-to-noise ratio is high. On the other hand, the comprehensiveness is relatively low due to a periodical's focus and non-continuous format. Newspapers 6050, alternatively, typically optimize more for comprehensiveness as they are less focused with regard to both content and customer segment, and they are delivered more frequently than periodicals. For on-line infrastructure, domain-specific news alerts (perhaps delivered by e-mail) 6030 represent a high signal/noise ration, but low comprehensiveness. On the other hand, general computer-based flat file systems 6060 exhibit potentially very high comprehensiveness, but the signal/noise ration is likely to be low. A trade-off frontier 6015 is collectively determined by the available publishing, broadcasting, telecommunications, and computer infrastructure available at a given time to a given organization or application.

Changes in infrastructure may enable the trade-off frontier 6015 to beneficially shift outward in model 6000—improving to some degree in both directions. The Web-based Internet represents such a break-through in shifting the trade-off curve between comprehensiveness and signal-to-noise.

It is true that prior to the Internet, computer-based applications certainly played an important role in the communications infrastructure. E-mail was certainly one obvious example. However, the Internet Protocol (IP) was a significant advance in that it enabled virtually universal connectivity. And the advent of the web browser enabled nearly universal publishing of information or knowledge.

Figure 9:
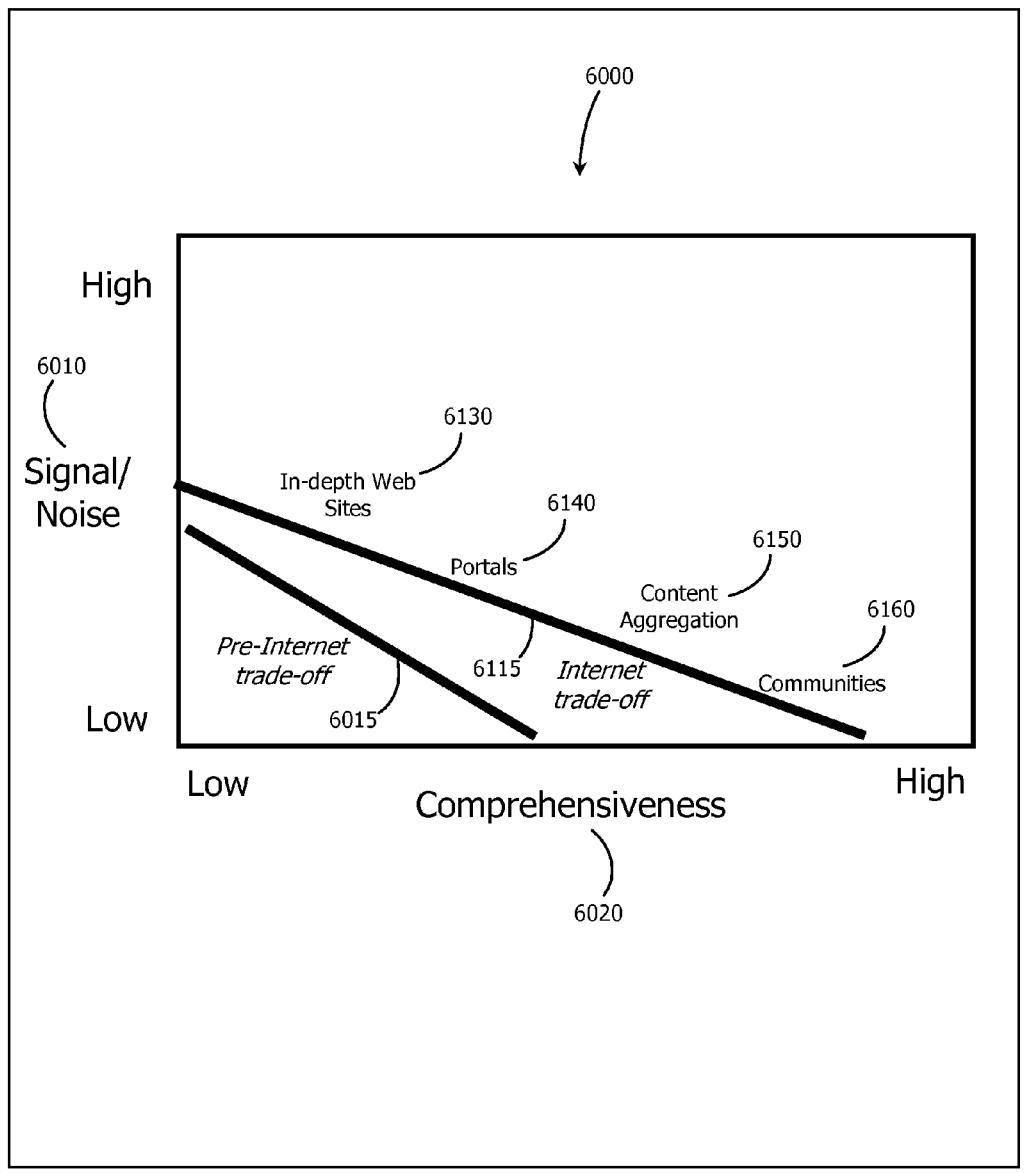
FIG. 9 is a diagram of additional details of the knowledge and content lifecycle model of FIG. 8, according to some embodiments.

Nevertheless, even with the application of Internet-based infrastructure, as shown in FIG. 9, there is still a trade-off 6115 between comprehensiveness and signal-to-noise ratio dimensions, although a more favorable trade-off than with previous communications infrastructures.

For example, highly focused, in-depth and/or exclusive web sites 6130 can deliver high signal-to-noise, but are relatively low in comprehensiveness. At the other end of the spectrum, on-line communities 6160 are typically very comprehensive, but the signal-to-noise ratio is generally quite low, due to most "content" being generated by those with a relatively low cost of time—which indirectly implies limited general demand for their information. In between these extremes are, for example, general web portals 6140, and generalized content aggregation services 6150.

Figure 10:
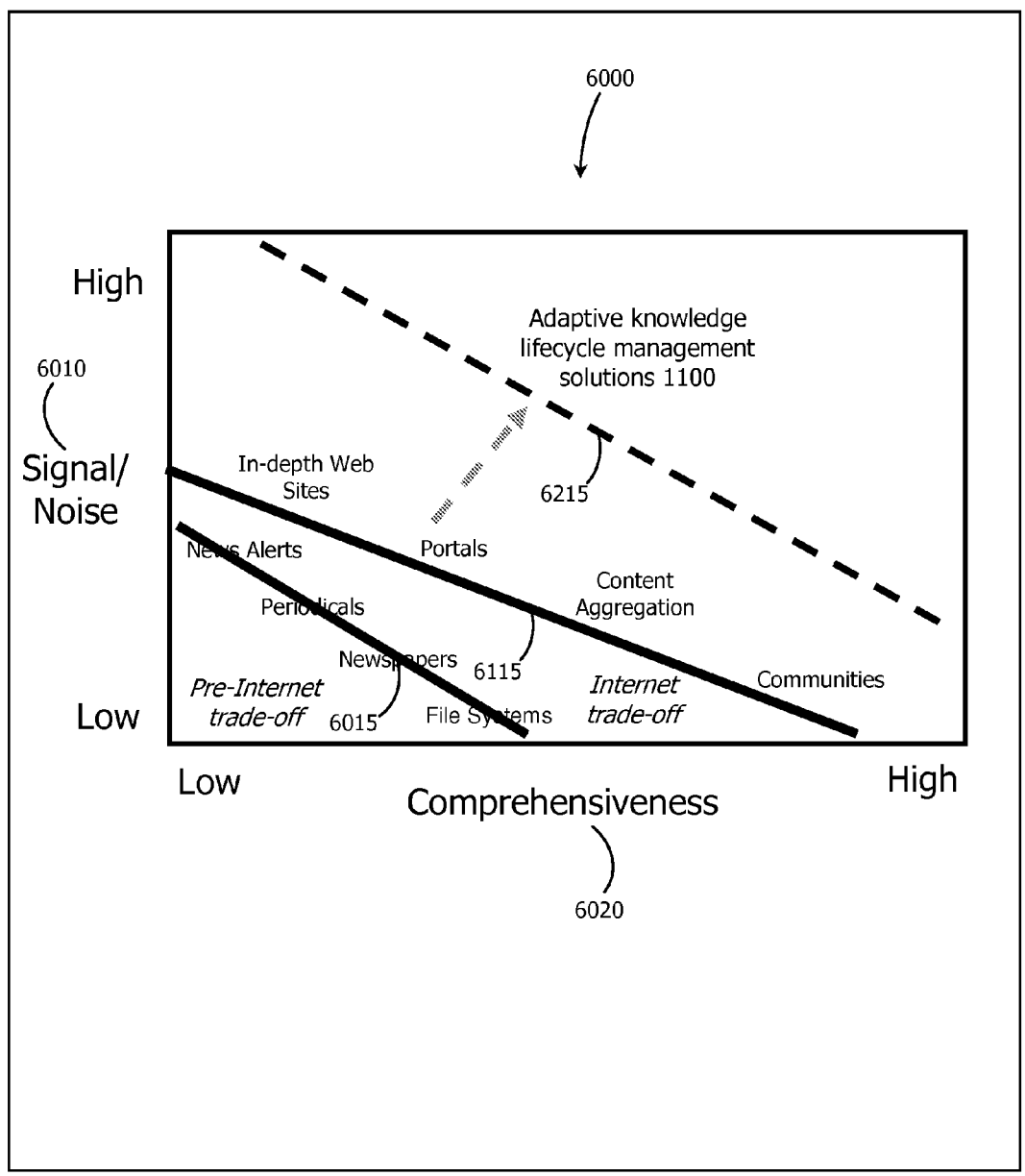
FIG. 10 is a diagram of additional details of the knowledge and content lifecycle model of FIG. 8, according to some embodiments.

According to some embodiments, as shown in FIG. 10, applying adaptive lifecycle management solutions 1100 may enable a beneficial shifting of the trade-off frontier 6215.

According to some embodiments, the knowledge and content lifecycle model 6000 implies that it is important to segment communications and knowledge management approaches according to how various information consumers at specific times or within specific contexts prefer to be positioned on the trade-off curve 6215. For example, for business executives, who have the highest cost of time, a customized structure that maximizes signal-to-noise at the expense of some comprehensiveness is critical, while for knowledge worker communities, optimizing for comprehensiveness is generally more appropriate. A portfolio of communications approaches and media may be managed according to information consumer segments. Information consumer segmentation may be applied as part of adaptive lifecycle management solutions 1100.

Figure 11:
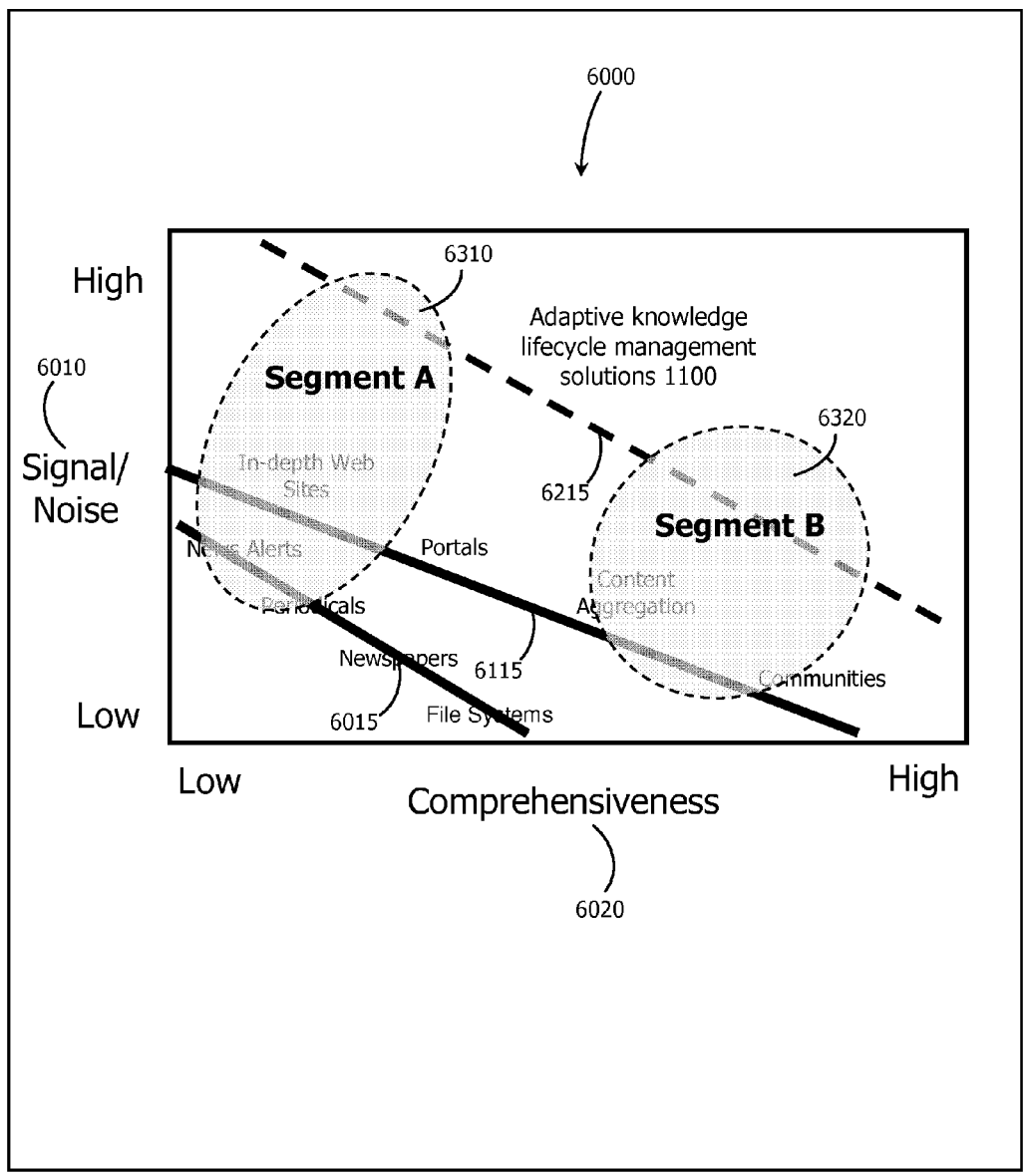
FIG. 11 is a diagram of mapping information consumer segments to the knowledge and content lifecycle model of FIG. 8, according to some embodiments.

As an example, FIG. 11 depicts two consumer segments mapped to the knowledge and content lifecycle model 6000. The first segment, segment A 6310, is consistent with a set of consumers of information whose opportunity cost of time is high. Therefore the portfolio of knowledge management and content delivery approaches is oriented with high signal/noise ratios at the expense of comprehensiveness. The knowledge management and content delivery approaches may span multiple infrastructure types, e.g., publishing and on-line approaches. Segment B 6320 is consistent with an information consumer segment that values comprehensiveness relatively more than high signal/noise rations, presumably due to a relative low opportunity cost of time.

Business Models

In some embodiments, the revenue model for adaptive knowledge lifecycle management solutions 1100 may be based on a subscription or service fee. Referring to FIG. 7, service fees may include the activities or results of supplier knowledge architects 1121, and/or direct customer support knowledge architects 1121s. Revenue models may include licensing fees for supplier computer-based software 925l, supplier proprietary knowledge assets 925k, and licensing for specific topologies, structures, or other organizing means of a plurality of supplier knowledge assets 925k and/or customer knowledge assets 2010. For example, a fuzzy network model may be applied as an organizing structure or ontology associated with supplier and/or knowledge assets. The specific categorizations, relationships and degree of relationships among a plurality of knowledge assets may be a proprietary asset that is licensed by suppliers of adaptive knowledge lifecycle management solutions 1100 to customers.

While the present invention has been described with respect to a limited number of embodiments, those skilled in the art will appreciate numerous modifications and variations therefrom. For instance, it may be appreciated that adaptive knowledge lifecycle management solutions of the present invention may furthermore integrate with the ManyWorlds Generative Investment™, Adaptive Decision Process and Adaptive Recombinant Processes methodologies. It is intended that the appended claims cover all such modifications and variations as fall within the true spirit and scope of this present invention.

What is claimed is:

1. A method of knowledge management comprising:
   identifying a plurality of computer-based knowledge assets;
   identifying a computer-implemented organizing structure for the plurality of computer-based knowledge assets;
   assessing a financial-based value for a plurality of the knowledge assets based on the computer-implemented organizing structure of the knowledge assets;
   using the financial-based value of the plurality of knowledge assets to decide on user navigable fuzzy network-based modifications to the computer-implemented organizing structure of the knowledge assets; and
   implementing the user navigable fuzzy network-based modifications.

2. The method of claim 1, wherein identifying a plurality of computer-based knowledge assets comprises:
   identifying a computer-based knowledge asset, the knowledge asset being selected from a group comprising an interactive computer-based application, an executable software instance, a Web page, a document, a graphic, a video, and an audio file.

3. The method of claim 1, wherein identifying a computer-implemented organizing structure for the plurality of computer-based knowledge assets comprises:
   identifying a relationship topology among the knowledge assets, the relationship topology being selected from a group comprising a hierarchy, a network, and a fuzzy network.

4. The method of claim 1, wherein identifying a computer-implemented organizing structure for the plurality of computer-based knowledge assets comprises:
   applying a knowledge asset lifecycle model.

5. The method of claim 1 further comprising:
   monitoring usage behaviors of one or more users of the plurality of computer-based knowledge assets;
   assessing automatically a value for one or more of the knowledge assets based; on usage behaviors associated with one or more of the plurality of knowledge assets; and
   adapting automatically the organizing structure of the knowledge assets consistent with the assessed value of the knowledge assets.

6. The method of claim 5, wherein adapting automatically the organizing structure of the knowledge assets consistent with the assessed value of the knowledge assets comprises:
   modifying the organizing structure of the knowledge assets, the modification being selected from a group consisting of modifying a relationship between a first knowledge asset and a second knowledge asset, generating a knowledge asset, and deleting a knowledge asset.

7. The method of claim 5, wherein adapting automatically the organizing structure of the knowledge assets consistent with the assessed value of the knowledge assets comprises:
   applying a knowledge asset lifecycle model.

8. The method of claim 1 wherein assessing a financial-based value for a plurality of the knowledge assets based on the computer-implemented organizing structure of the knowledge assets comprises:
   assessing a relative value for a plurality of the knowledge assets based on the number of the plurality of knowledge assets and the organizing structure of the knowledge assets.

9. The method of claim 8, wherein assessing a relative value for a plurality of the knowledge assets based on the number of the plurality of knowledge assets and the organizing structure of the knowledge assets comprises:
   identifying a relationship topology among knowledge assets, the relationship topology being selected from a group comprising a hierarchy, a network, and a fuzzy network.

10. The method of claim 8, wherein assessing a relative value for a plurality of the knowledge assets based on the number of the plurality of knowledge assets and the organizing structure of the knowledge assets comprises:
    applying a valuation procedure that takes as input an indicator of the number of knowledge assets and the relationships among the knowledge assets; and
    generating a relative value for the plurality of knowledge assets.

11. The method of claim 10, further comprising:
    applying a valuation algorithm in which network value scales proportional to $N \ln(N)$, where N is the number of knowledge assets that are related.

12. The method of claim 11, further comprising:
    applying a valuation algorithm that includes the cost of accessing one or more of the plurality of knowledge assets.

13. The method of claim 10, further comprising:
    applying an experimental design model.

14. The method of claim 13, wherein applying an experimental design model comprises:
    applying a valuation algorithm in which relative value scales proportional to the square root of the average access cost of the plurality of knowledge assets.

* * * * *